(12) United States Patent
Bojer

(10) Patent No.: US 7,284,566 B2
(45) Date of Patent: Oct. 23, 2007

(54) VALVE ARRANGEMENT FOR GUIDING A LIQUID AGAINST A GAS PRESSURE GRADIENT

(75) Inventor: Oliver Bojer, Lingen (DE)

(73) Assignee: Hengst GmbH & Co. KG, Muenster (DE)

(*) Notice: Subject to any disclaimer, the term of this patent is extended or adjusted under 35 U.S.C. 154(b) by 92 days.

(21) Appl. No.: 11/019,996

(22) Filed: Dec. 23, 2004

(65) Prior Publication Data

US 2005/0161083 A1    Jul. 28, 2005

(30) Foreign Application Priority Data

Dec. 24, 2003   (DE) ............... 203 20 046 U

(51) Int. Cl.
*F16T 1/14* (2006.01)

(52) U.S. Cl. ............. 137/178; 137/630.13; 137/630.16

(58) Field of Classification Search ............. 137/171, 137/178, 513.3, 513.7, 629, 630.13, 630.16, 137/601.2, 601.02
See application file for complete search history.

(56) References Cited

U.S. PATENT DOCUMENTS

| | | | | |
|---|---|---|---|---|
| 836,696 | A | * | 11/1906 | Morgan ................... 137/178 |
| 1,717,425 | A | * | 6/1929 | Weaver ................... 417/447 |
| 2,071,969 | A | * | 2/1937 | Diescher ................. 137/220 |
| 3,219,058 | A | * | 11/1965 | Thorburn ................ 137/596.2 |
| 4,054,109 | A | * | 10/1977 | Herrin et al. ........... 123/90.16 |
| 4,880,030 | A | * | 11/1989 | Terry ...................... 137/460 |
| 4,993,517 | A | * | 2/1991 | Leipelt et al. .......... 184/105.1 |
| 5,076,321 | A | * | 12/1991 | Terry ...................... 137/460 |
| 6,394,060 | B2 | * | 5/2002 | Nagai et al. ............ 123/196 R |
| 6,626,163 | B1 | | 9/2003 | Busen et al. |

FOREIGN PATENT DOCUMENTS

| | | |
|---|---|---|
| DE | 29605425 | 7/1996 |
| DE | 29908116 | 11/2000 |

* cited by examiner

*Primary Examiner*—Eric Keasel
*Assistant Examiner*—Craig M. Schneider
(74) *Attorney, Agent, or Firm*—Greenblum & Bernstein, P.L.C.

(57) ABSTRACT

Valve arrangement for guiding a liquid against a gas pressure gradient. The valve arrangement includes first, second and third pressure areas connected in series. An intake opens into the first pressure area. An outlet opens into the third pressure area. Flow check valves selectively open or close passage openings between the first and second pressure areas and between the second and third pressure areas. Whereby the flow check valves, free from outside influences, are opened when in a resting position and are automatically held in a closed position by gas counterpressure. Whereby the first and third pressure areas are respectively connected to the second pressure area via a ventilation line. Whereby a ventilation valve coupled to at least one of the ventilation lines, the ventilation valve selectively opening or closing the at least one of the ventilation lines. This Abstract is not intended to define the invention disclosed in the specification, nor intended to limit the scope of the invention in any way.

19 Claims, 1 Drawing Sheet

VALVE ARRANGEMENT FOR GUIDING A LIQUID AGAINST A GAS PRESSURE GRADIENT

CROSS-REFERENCE TO RELATED APPLICATIONS

The present application claims priority under 35 U.S.C. § 119 of German Patent Application No. 203 20 046.2, filed Dec. 24, 2003, the disclosure of which is expressly incorporated by reference herein in its entirety.

BACKGROUND OF THE INVENTION

1. Field of the Invention

The invention relates to a valve arrangement for guiding a liquid against a gas pressure gradient.

2. Discussion of Background Information

Situations are known in practice where a liquid has to be guided against a gas flow or a gas counterpressure. In the field of internal combustion engines, in particular in the field of automotive engineering, a situation like this exists, e.g., in the area of crankcase ventilation: gas that flows out of the crankcase through a liquid-vapor separator is guided into the suction passage of the internal combustion engine. The pressure prevailing in the suction passage or in the flow direction behind the liquid-vapor separator is lower than the pressure prevailing in the crankcase. However, the oil separated in the liquid-vapor separator is intended to drain into the crankcase.

It is known from DE 296 05 425 to provide a leaf spring valve for the separated oil, which valve is arranged in an oil collecting tank. As soon as separated oil accumulates in this collecting tank and reaches a preset hydrostatic level, the leaf spring opens due to the hydrostatic pressure and the oil can drain out. However, as soon as gas flows through the opening, a pressure difference forms again at the leaf spring and causes the flow check valve formed by the leaf spring to close again automatically. It is a disadvantage in this technical solution on the one hand that a high manufacturing accuracy in the area of the leaf spring is necessary in order to ensure uniform valve properties in series production, moreover, a certain minimum construction height of the oil collection chamber is necessary to achieve the desired hydrostatic pressure, which is a drawback in view of the frequently cramped installation conditions, e.g., in the engine compartment of a motor vehicle. In different engine concepts the pressure difference at the separator is so great that draining off the separated oil is possible only when the engine is at rest. The dimensions of the oil collection chamber then have to be so large that the entire oil amount collected until the engine is switched off can be stored.

SUMMARY OF THE INVENTION

The invention provides for a device which renders possible the reliable draining of a liquid against a gas pressure gradient, and which renders possible a reliable function with the simplest possible means and takes up little construction space.

The invention accordingly proposes implementing a lock solution. The main item of this arrangement is a lock chamber that is provided with a flow check valve in the intake area as well as in the outlet area. The blocking direction of the flow check valves acts against the desired conveyor direction of the liquid. In the lock chamber the pressure is alternately switched on in front of the lock chamber and behind the lock chamber by means of a ventilation device, thus by way of one or more ventilation valves the central pressure area is acted on alternately with the pressure of the area under the lock chamber and with the pressure above the lock chamber.

In the idle condition, the flow check valves are open so that the lock chamber is penetrable and the accumulated oil can reliably flow back into the crankcase and there is no danger that accumulated partial amounts of oil and moisture condensate possibly freeze under cold weather conditions and possibly lead to inoperability of the valve arrangement—e.g., in the case of repeated short-distance operation. The targeted opening or closing of the flow check valves is determined by the opened or closed ventilation lines, so that the individual flow check valves do not need to have very precisely identical valve properties.

The lock chamber and its intake and outlet areas form three pressure areas. For simplification, these three pressure areas are referred to below as three "chambers." However, a component that has to feature a valve assembly with three respectively closed chambers does not actually need to be provided in practice; rather line sections can also connect to the central lock chamber and represent the adjacent pressure areas, or the central lock chamber can connect directly to an induction pipe or a crankcase.

The ventilation valves can be controlled, e.g., electrically; in this way they can be influenced by an engine management that is provided anyway, so that a precise design of the function of the valve arrangement is possible for the vehicle manufacturer or engine manufacturer.

Alternatively, the ventilation valves can be switched pneumatically by a pressure difference that changes during the engine operation (e.g., pressure difference between ambient pressure and induction pipe pressure of the engine), so that no expensive installation of electrical supply or control lines and an accordingly more complex wiring harness are necessary, depending on the assembly position of the valve arrangement.

In a particularly cost-effective embodiment, leaf valves can be used as flow check valves.

Two-way valves, i.e., straight-way valves, can be advantageously provided in the ventilation lines in order to selectively open or close each ventilation line.

It can likewise be provided in a cost-effective manner to combine the ventilation lines leading to the central chamber into a common section of both ventilation lines. In such a case it can be further provided instead of two separate valves in the two ventilation lines to use a common three-way valve, e.g., a three-two-way valve, which for ventilation selectively through-switches the ventilation line from one or the other outer chamber to the central chamber.

The invention also provides for a valve arrangement for guiding a liquid against a gas pressure gradient, wherein the valve arrangement comprises first, second and third pressure areas connected in series, an intake opening into the first pressure area, an outlet opening into the third pressure area, and flow check valves selectively opening or closing passage openings between the first and second pressure areas and between the second and third pressure areas. Whereby the flow check valves, free from outside influences, are opened when in a resting position and are automatically held in a closed position by gas counterpressure, whereby the first and third pressure areas are respectively connected to the second pressure area via a ventilation line, and whereby a ventilation valve coupled to at least one of the ventilation lines, the ventilation valve selectively opening or closing the at least one of the ventilation lines.

Each ventilation valve may be electrically controlled. Each ventilation valve may be pneumatically controlled. The flow check valves may be leaf valves. The ventilation valve may comprise first and second two-way valves arranged on different ventilation lines. The ventilation lines may have a common section leading to the second pressure area. The ventilation valve may comprise a three-way valve which is connected to each of the ventilation lines and to a common section coupled to the second pressure area. The three-way valve may be a three-two-way valve.

The invention also provides for a method of allowing oil to flow into a crankcase through the valve arrangement described above, wherein the method comprises coupling the intake to an oil collection line, coupling the outlet to the crankcase, and preventing, with one of the flow check valves, the oil from flowing back to the first pressure area after the oil has moved to the second pressure area from the first pressure area, wherein the valve arrangement allows the oil to flow from the first pressure area to the second pressure area when the one of the flow check valves is open, and from the second pressure area to the third pressure area when another of the flow check valves is open.

The invention also provides for a valve arrangement comprising first, second, and third chambers, an intake communicating with the first chamber, an outlet communicating with the third chamber, the second chamber arranged between the first and third chambers, a first flow check valve selectively opening and closing a passage opening between the first and second chambers, a second flow check valve selectively opening and closing a passage opening between the second and third chambers, the first and second flow check valves being open in a resting position and being adapted to close automatically by pressure, and a ventilation system arranged to at least one of equalize pressure between the first and second chambers and equalize pressure between the third and second chambers.

The invention also provides for a method of allowing oil to flow into a crankcase through the valve arrangement, wherein the method comprises coupling the intake to an oil collection line, coupling the outlet to the crankcase, and preventing, with the first flow check valve, the oil from flowing back to the first chamber after the oil has moved to the second chamber from the first chamber, wherein the valve arrangement allows the oil to flow from the first chamber to the second chamber when the first flow check valve is open, and from the second chamber to the third chamber when the second flow check valve is open.

The ventilation system may comprise ventilation lines communicating with each of the first, second and third chambers and at least one ventilation valve. One of the ventilation lines may comprise a first ventilation line providing communication between the first and second chambers and another ventilation line may comprise a second ventilation line providing communication between the third and second chambers. At least one ventilation valve may be coupled to at least one of the first and second ventilation lines. The at least one ventilation valve may selectively open and close the first ventilation line. The at least one ventilation valve may selectively open and close the second ventilation line. The at least one ventilation valve may selectively open or close each of the first and second ventilation lines. The at least one ventilation valve is coupled to each of the first and second ventilation lines and to a common line that is coupled to the second chamber. The at least one ventilation valve is electrically or pneumatically controlled.

The invention also provides for a valve arrangement comprising a body comprising first, second, and third chambers, an intake communicating with the first chamber, and an outlet communicating with the third chamber, the second chamber arranged between the first and third chambers, a first flow check valve selectively opening and closing a passage opening between the first and second chambers, a second flow check valve selectively opening and closing a passage opening between the second and third chambers, the first flow check valve being open in a resting position and closing automatically by pressure in the second chamber, the second flow check valve being open in a resting position and closing automatically by pressure in the third chamber, and a controlled ventilation system arranged to at least one of equalize pressure between the first and second chambers and equalize pressure between the third and second chambers.

The controlled ventilation system may comprise ventilation lines communicating with each of the first, second and third chambers and at least one ventilation valve.

The invention also provides for a method of allowing oil to flow into a crankcase through the valve arrangement described above, wherein the method comprises coupling the intake to an oil collection line, coupling the outlet to the crankcase, and preventing, with the first flow check valve, the oil from flowing back to the first chamber after the oil has moved to the second chamber from the first chamber, wherein the valve arrangement allows the oil to flow from the first chamber to the second chamber when the first flow check valve is open, and from the second chamber to the third chamber when the second flow check valve is open.

BRIEF DESCRIPTION OF THE DRAWINGS

Two exemplary embodiments of valve arrangements according to the innovation with different embodiment of the ventilation lines are explained below on the basis of the purely diagrammatic figures, wherein.

DETAILED DESCRIPTION OF THE PRESENT INVENTION

Figure 1:
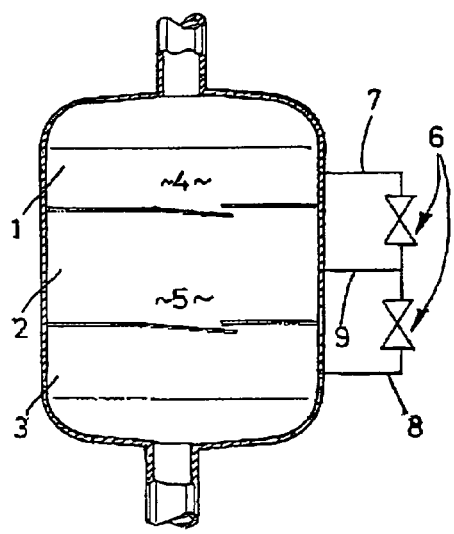
FIG. 1 shows a first exemplary embodiment of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Numbers 1, 2 and 3 thereby respectively designate an arrangement of three chambers connected in series, whereby the geodetically upper chamber 1 is connected to the oil collection line of a liquid-vapor separator of a crankcase ventilation or represents the oil collection area of a liquid-vapor separator. The separated oil therefore arrives first in this first or upper chamber 1.

The geodetically lower chamber 3 features an outlet for the oil, which outlet leads to the crankcase or represents an area under the lock chamber 2 which area communicates directly with the crankcase, whereby a higher pressure prevails in the crankcase and thus also in the outlet opening of the chamber 3 than in the suction passage and thus in the inlet line for the oil, which line connects to the upper chamber 1.

Both chambers 1 and 3 can each be closed with respect to the central chamber 2, the so-called lock chamber, by a flow check valve 4 or 5, whereby these two flow check valves 4 and 5 are respectively embodied as a leaf valve. As can be seen from FIG. 1, the flow check valves 4 and 5 are in the opened state in their rest position with leaf springs opened downwards. If oil has accumulated in one of the chambers 1 or 2, due to the opened flow check valves it can automatically reach chamber 3 and run back to the crankcase as soon as the internal combustion engine is at rest.

During engine operation due to the higher crankcase pressure a higher pressure will prevail in the lower chamber 3 than in the central chamber 2 or the upper chamber 1, so that at least one of the flow check valves 4 and 5 controlled by the pressure differential is closed during engine operation. At first, two ventilation valves 6 are closed thereby.

However, if the upper ventilation valve 6 is opened, an equalization of pressure takes place between the upper two chambers 1 and 2 via an upper ventilation line 7, so that the upper flow check valve 4 opens and first accumulated oil can flow out of the upper chamber 1 into the central chamber 2.

Subsequently, the upper ventilation valve 6 is closed and the lower ventilation valve 6 is opened, so that an equalization of pressure takes place between the two lower chambers 2 and 3 via a lower ventilation line 8. Due to this equalization of pressure in this case the upper flow check valve 4 closes and the lower flow check valve 5 opens, and the oil can leave the central chamber 2 arriving in the lower chamber 3 and from there reach the crankcase through the outlet.

The two ventilation lines 7 and 8 have a common section 9 so that only a single line section connects to the central chamber 2 in a simple manner in terms of manufacturing technology.

If the two lower chambers 2 and 3 have the same internal pressure when the lower ventilation line 8 and the flow check valve 5 are open, this internal pressure is greater than the pressure prevailing in the upper chamber 1, so that in this operating condition the upper flow check valve 4 automatically closes and oil is thus reliably prevented from being entrained upwards and from being able to reach the suction passage of the internal combustion engine.

With electric control of the ventilation valves 6, it can be provided to open them at certain time intervals, whereby these intervals can be preset, e.g., through the engine management, e.g., depending on the respective current operating conditions of the engine.

With a pneumatic activation of the ventilation valves 6, e.g., their activation occurs depending on the pressure differences between the ambient pressure and the pressures in the suction passage, thus at uncertain time intervals compared with an electrically controlled activation of these ventilation valves 6.

Figure 2:
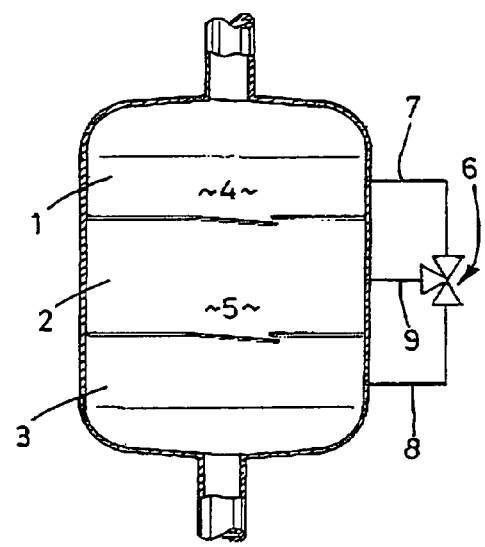
FIG. 2 shows a second exemplary embodiment of the invention.

The exemplary embodiment according to FIG. 2 differs only in the area of the ventilation lines from that of FIG. 1. In FIG. 2 a single ventilation line 6 is provided which is embodied as a three-two-way valve and is connected to the upper and lower ventilation lines 7 and 8 and to the common section 9 of the ventilation lines 7 and 8 which leads to the central chamber 2. The ventilation valve 6 embodied as a three-two-way valve can optionally switch the upper ventilation line 7 from the first chamber 1 to the central chamber 2 while the connection between lock chamber 2 and chamber 3 is simultaneously blocked, or switch the lower ventilation line 8 from the lower chamber 3 to the central chamber 2 and simultaneously block the connection between pressure area 1 and lock chamber 2.

The three-two-way valve according to FIG. 2 has the advantage of rendering possible the same function as the two individual two-way valves with particularly small construction space and with control lines to be laid to only one location.

In comparison, the use of two separate two-way valves fundamentally has the advantage that, in the event of a failure of the sealing function of one of the two flow check valves, the leakage flow from the pressure area acted on with crankcase pressure to the pressure area acted on with the induction pipe pressure is possible only when the two-way valve is opened which is connected in parallel to the second flow check valve.

In the two exemplary embodiments of FIGS. 1 and 2 it is possible to arrange the ventilation valves 6—other than shown in the purely diagrammatic drawings—remote from the chambers 1 through 3 so that the construction space necessary for accommodating the chambers 1 through 3 can have correspondingly small dimensions.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A valve arrangement for guiding a liquid against a gas pressure gradient, the valve arrangement comprising:
   first, second and third pressure areas connected in series;
   an intake opening into the first pressure area;
   an outlet opening into the third pressure area;
   flow check valves selectively opening or closing passage openings between the first and second pressure areas and between the second and third pressure areas,
   whereby the flow check valves, free from outside influences, are opened when in a resting position and are automatically held in a closed position by gas counterpressure as follows:
      the flow check valve between the first and second pressure areas closing automatically when a pressure in the second pressure area is greater than a pressure in the first pressure area; and
      the flow check valve between the second and third pressure areas closing automatically when a pressure in the third pressure area is greater than a pressure in the second pressure area,
   whereby the first and third pressure areas are respectively connected to the second pressure area via ventilation lines, and
   whereby at least one ventilation valve is coupled to at least one of the ventilation lines, the at least one ventilation valve selectively opening or closing the at least one of the ventilation lines.

2. The valve arrangement according to claim 1, wherein each ventilation valve is electrically controlled.

3. The valve arrangement according to claim 1, wherein each ventilation valve is pneumatically controlled.

4. The valve arrangement according to claim 1, wherein the flow check valves are leaf valves.

5. The valve arrangement according to claim 1, wherein the at least one ventilation valve comprises first and second two-way valves arranged on different ventilation lines.

6. The valve arrangement according to claim 1, wherein the ventilation lines have a common section leading to the second pressure area.

7. A method of allowing oil to flow into a crankcase, the method comprising: providing the valve arrangement of claim 1;
coupling the intake to an oil collection line;
coupling the outlet to the crankcase; and
preventing, with one of the flow check valves, the oil from flowing back to the first pressure area after the oil has moved to the second pressure area from the first pressure area,
wherein the valve arrangement allows the oil to flow from the first pressure area to the second pressure area when the one of the flow check valves is open, and from the second pressure area to the third pressure area when another of the flow check valves is open.

8. The valve arrangement according to claim 1, wherein the at least one ventilation valve comprises a three-way valve which is connected to each of the ventilation lines and to a common section coupled to the second pressure area.

9. The valve arrangement according to claim 8, wherein the three-way valve is a three-two-way valve.

10. A valve arrangement comprising:
first, second, and third chambers;
an intake communicating with the first chamber;
an outlet communicating with the third chamber;
the second chamber arranged between the first and third chambers;
a first flow check valve selectively opening and closing a passage opening between the first and second chambers;
a second flow check valve selectively opening and closing a passage opening between the second and third chambers;
the first and second flow check valves being open in a resting position and being adapted to close automatically by pressure as follows:
the first flow check valve closing automatically when the second chamber experiences greater pressure than the first chamber; and
the second flow check valve closing automatically when the third chamber experiences greater pressure than the second chamber; and
a ventilation system arranged to at least one of equalize pressure between the first and second chambers and equalize pressure between the third and second chambers.

11. A method of allowing oil to flow into a crankcase, the method comprising: providing the valve arrangement of claim 10;
coupling the intake to an oil collection line;
coupling the outlet to the crankcase; and
preventing, with the first flow check valve, the oil from flowing back to the first chamber after the oil has moved to the second chamber from the first chamber,
wherein the valve arrangement allows the oil to flow from the first chamber to the second chamber when the first flow check valve is open, and from the second chamber to the third chamber when the second flow check valve is open.

12. The valve arrangement of claim 10, wherein the ventilation system comprises ventilation lines communicating with each of the first, second and third chambers and at least one ventilation valve.

13. The valve arrangement of claim 12, wherein one of the ventilation lines comprises a first ventilation line providing communication between the first and second chambers and another ventilation line comprises a second ventilation line providing communication between the third and second chambers.

14. The valve arrangement of claim 13, wherein at least one ventilation valve is coupled to at least one of the first and second ventilation lines.

15. The valve arrangement of claim 13, wherein the at least one ventilation valve selectively opens and closes the first ventilation line.

16. The valve arrangement of claim 1, wherein the at least one ventilation valve selectively opens and closes the second ventilation line.

17. The valve arrangement of claim 1, wherein the at least one ventilation valve selectively opens or closes each of the first and second ventilation lines.

18. The valve arrangement of claim 1, wherein the at least one ventilation valve is coupled to each of the first and second ventilation lines and to a common line that is coupled to the second chamber.

19. The valve arrangement of claim 1, wherein the at least one ventilation valve is electrically or pneumatically controlled.

* * * * *

UNITED STATES PATENT AND TRADEMARK OFFICE
CERTIFICATE OF CORRECTION

PATENT NO. : 7,284,566 B2 Page 1 of 1
APPLICATION NO. : 11/019996
DATED : October 23, 2007
INVENTOR(S) : O. Bojer It is certified that error appears in the above-identified patent and that said Letters Patent is hereby corrected as shown below:

On the cover Item (30), Foreign Application Priority Data, "203 20 046" should be --203 20 046.2--.

At claim 16, line 1, "claim 1" should be --claim 13--.

At claim 17, line 1, "claim 1" should be --claim 13--.

At claim 18, line 1, "claim 1" should be --claim 13--.

At claim 19, line 1, "claim 1" should be --claim 13--.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,284,566 B2 | Page 1 of 1 |
| APPLICATION NO. | : 11/019996 | |
| DATED | : October 23, 2007 | |
| INVENTOR(S) | : O. Bojer | |

It is certified that error appears in the above-identified patent and that said Letters Patent is hereby corrected as shown below:

On the cover Item (30), Foreign Application Priority Data, "203 20 046" should be --203 20 046.2--.

Column 8, at claim 16, line 38, "claim 1" should be --claim 13--.

Column 8, at claim 17, line 41, "claim 1" should be --claim 13--.

Column 8, at claim 18, line 44, "claim 1" should be --claim 13--.

Column 8, at claim 19, line 49, "claim 1" should be --claim 13--.

This certificate supersedes the Certificate of Correction issued September 16, 2008.

Signed and Sealed this

Seventh Day of October, 2008

JON W. DUDAS
*Director of the United States Patent and Trademark Office*